United States Patent Office 3,776,905
Patented Dec. 4, 1973

3,776,905
STYRYLTRIAZOLES, THEIR USE FOR THE OPTICAL BRIGHTENING OF ORGANIC MATERIALS, AND PROCESSES FOR THEIR MANUFACTURE
Reinhard Zweidler, Basel, Guglielmo Kabas, Binningen, Hans Schlaepfer, Basel, and Ian John Fletcher, Munchenstein, Switzerland, assignors to Ciba-Geigy Corporation, Ardsley, N.Y.
No Drawing. Filed Dec. 6, 1971, Ser. No. 205,287
Claims priority, application Switzerland, Dec. 11, 1970, 18,366/70
Int. Cl. C09b 23/14
U.S. Cl. 260—240.1    14 Claims

ABSTRACT OF THE DISCLOSURE

The invention relates to new styryltriazoles which in the 2-position possess a coumarinyl-(7) group which is substituted in the 3-position. These compounds are prepared by known methods. They are useful as optical brighteners for organic material.

---

The present invention relates to new styryltriazoles which in the 2-position possess a coumarinyl-(7) group which is substituted in the 3-position, and to the use of these compounds for the optical brightening of synthetic and natural organic materials, as well as processes for the manufacture of the compounds.

The new styryl-triazoles correspond to the formula (1) 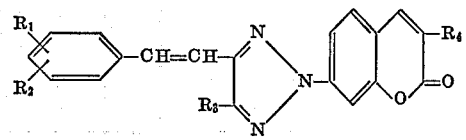

wherein $R_1$ denotes hydrogen, halogen (preferably chlorine), alkyl with 1 to 4 carbon atoms (preferably methyl), alkoxy with 1 to 4 carbon atoms (preferably methoxy), or optionally substituted phenyl, $R_2$ denotes hydrogen or halogen (preferably chlorine), $R_3$ denotes hydrogen or halogen (preferably chlorine) and $R_4$ denotes optionally quaternised and/or substituted imidazol-1-yl, benzimidazol-2-yl, pyrazol-1-yl, benzotriazol-1-yl, benzotriazol-2-yl or 1,2,4-triazol-1-yl.

(4) 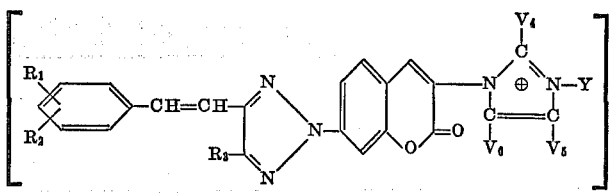

Possible substituents of the imidazole, pyrazole and triazole radicals are above all alkyl with 1 to 4 carbon atoms, preferably methyl, and phenyl which is optionally substituted further but is preferably unsubstituted. In the imidazol-1-yl radical and 1,2,3-triazol radicals, two substituents together can form a fused, optionally substituted, phenylene radical. The number of substituents of the imidazole and pyrazole radicals can be up to 3. Preferably, however, only one substituent, or none at all, is present. In the 1,2,4-triazol-1-yl radical of course only two substituents can be present on carbon atoms. Preferably, however, these radicals are also unsubstituted or monosubstituted. The phenylene radicals fused to the heterocyclic structures in benzimidazol-1-yl, benzimidazol-2-yl, benzotriazol-1-yl and benzotriazol-2-yl can be substituted by halogen, preferably chlorine, alkyl with 1 to 4 carbon atoms, preferably methyl, or alkoxy with 1 to 4 carbon atoms, preferably methoxy. The number of substituents in general does not exceed the number 2. In many cases, only one such substituent, or preferably none at all, is present. The styryltriazoles can be converted into salts by quaternisation, preferably of a nitrogen atom of the radical $R_4$. As substituents of the nitrogen atom, alkyl radicals with 1 to 4 carbon atoms, preferably methyl or ethyl, or aralkyl radicals, preferably benzyl, are of particular interest. The anion is a strong acid which does not possess any dyestuff character, for example the acid radical of an alkyl sulphate with 1 to 4 carbon atoms, especially of methyl sulphate and ethyl sulphate, the acid radical of a colourless arylsulphonic acid, such as, for example, of benzenesulphonic acid which is optionally substituted further by alkyl, alkoxy or halogen, especially of p-toluenesulphonic acid or of benzenesulphonic acid, or of a hydrogen halide, especially of hydrochloric acid or of hydrobromic acid. The anion introduced during quaternisation can however naturally be replaced easily by other anions, such as, for example, carboxylic acid radicals. If the radical $R_4$ in the Formula 1 is represented as a formula, the following formulae result:

(2) 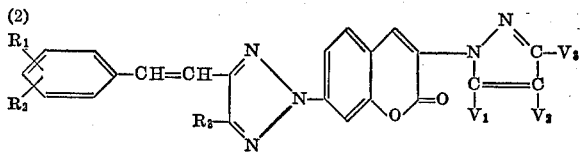

wherein $V_1$ and $V_3$ denote hydrogen, alkyl with 1 to 4 carbon atoms or phenyl and $V_2$ denotes hydrogen or halogen, (3) 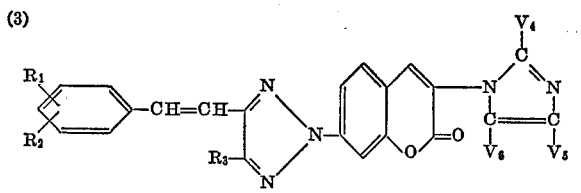

wherein $V_4$, $V_5$ and $V_6$ denote hydrogen, alkyl with 1 to 4 carbon atoms or phenyl, or $V_5$ and $V_6$ together denote a fused phenylene radical which is optionally substituted by chlorine or methyl, $Q^{\ominus}$ wherein $V_4$, $V_5$ and $V_6$ have the indicated meaning, Y denotes alkyl with 1 to 4 carbon atoms or benzyl and Q denotes chlorine, bromine, $SO_4$-alkyl (1 to 4 carbon atoms), $SO_3$-phenyl or $SO_3$-p-toluyl, (5) 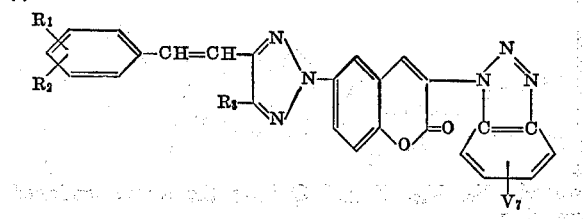

wherein V₇ denotes hydrogen, chlorine or methyl, (6)
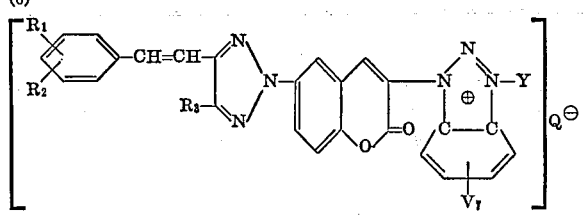

wherein V₇, Y and Q have the abovementioned meaning, (7)
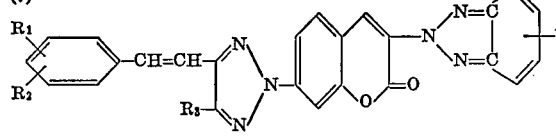

wherein V₇ has the abovementioned meaning, (8)
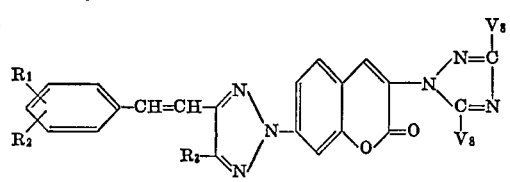

wherein V₈ denotes hydrogen or alkyl with 1 to 4 carbon atoms, (9)
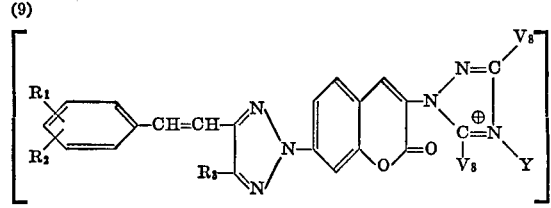

wherein V₈, Y and Q have the abovementioned meaning,

(10)
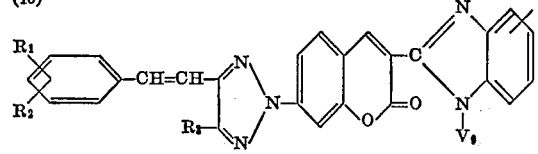

wherein V₉ denotes hydrogen, alkyl with 1 to 4 carbon atoms or benzyl and V₁₀ denotes hydrogen, chlorine or methyl, and

(11)
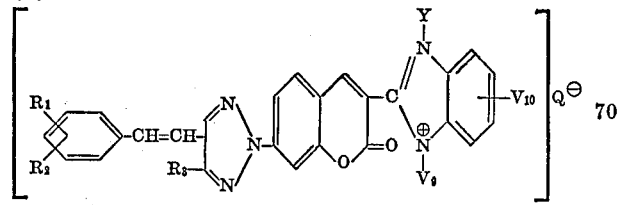

wherein V₉, V₁₀, Y and Q have the abovementioned meaning.

In the Formulae 2 to 11, the symbols $R_1$, $R_2$ and $R_3$ in each case have the meaning indicated for Formula 1.

Amongst the compounds embraced by the Formulae 2 to 11, those in which the V radicals in each case represent hydrogen are particularly preferred.

Compounds of particular practical interest are those of the formulae

(12)
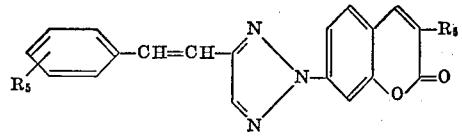

wherein $R_5$ denotes hydrogen, chlorine, methyl, or phenyl and $R_6$ denotes imidazol-1-yl, benzimidazol-2-yl, pyrazol-1-yl, benzothiazol-1-yl, benzotriazol-2-yl or 1,2,4-triazol-1-yl, and

(13)
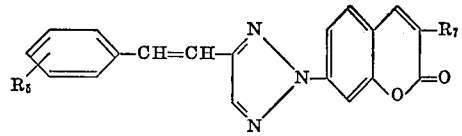

wherein $R_5$ has the abovementioned meaning and R) denotes benzotriazolium-1-yl, 1,2,4-triazolium-1-yl or benzimidazolium-2-yl.

Tables I to V which follow list individual compounds which corresponds to the General Formulae 2 to 11.

TABLE I.—COMPOUNDS OF THE FORMULA 2

| Formula number | R₁ | R₂ | R₃ | V₁ | V₂ | V₃ |
|---|---|---|---|---|---|---|
| 14 | H | H | H | H | H | H |
| 15 | H | H | H | H | H | CH₃ |
| 16 | 3-Cl | H | H | H | H | H |
| 17 | 2-Cl | H | H | H | H | CH₃ |
| 18 | 3-Cl | H | H | H | H | CH₃ |
| 19 | 4-Cl | H | H | H | H | CH₃ |
| 20 | 4-CH₃ | H | H | H | Cl | CH₃ |
| 21 | 4-OCH₃ | H | H | H | H | CH₃ |
| 22 | 4-phenyl | H | H | H | H | CH₃ |
| 23 | 4-chloro | 3-chloro | H | H | H | CH₃ |
| 24 | 3-chloro | H | H | H | H | Phenyl |
| 25 | H | H | Cl | H | H | CH₃ |

TABLE II.—COMPOUNDS OF THE FORMULAE 3 AND 4

| Formula number | R₁ | R₂ | R₃ | V₄ | V₅ | V₆ | Y | Q⊖ |
|---|---|---|---|---|---|---|---|---|
| 26 | H | H | H | H | H | H | | |
| 27 | 3-Cl | H | H | CH₃ | H | H | | |
| 28 | H | H | Cl | H | H | H | | |
| 29 | 4-phenyl | H | H | H | H | H | | |
| 30 | H | H | H | H | H | H | CH₃ | SO₄—CH₃ |
| 31 | 3-Cl | H | H | H | H | H | CH₃ | SO₃-p-toluyl |
| 32 | H | H | Cl | H | H | H | CH₃ | SO₃-phenyl |
| 33 | 4-phenyl | H | H | H | H | H | CH₃ | SO₄-CH₃ |
| 34 | H | H | H | H | Fused phenylene | | | |
| 35 | 2-Cl | H | H | H | Fused phenylene | | | |
| 36 | H | H | Cl | H | Fused phenylene | | | |
| 37 | 4-phenyl | H | H | H | Fused phenylene | | | |
| 38 | H | H | H | H | Fused phenylene | | CH₃ | SO₄-CH₃ |
| 39 | H | H | Cl | H | Fused phenylene | | CH₃ | SO₃-p-toluyl |

TABLE III.—COMPOUNDS OF THE FORMULAE 5 AND 6

| Formula number | R₁ | R₂ | R₃ | V₇ | Y | Q⊖ |
|---|---|---|---|---|---|---|
| 40 | H | H | H | H | | |
| 41 | 3-Cl | H | H | H | | |
| 42 | H | H | Cl | H | | |
| 43 | 4-phenyl | H | H | H | | |
| 44 | H | H | H | H | CH₃ | SO₄-CH₃ |
| 45 | H | H | Cl | H | CH₃ | SO₄-CH₃ |
| 46 | 4-phenyl | H | H | H | CH₃ | SO₃-p-toluyl |

TABLE IV.—COMPOUNDS OF THE FORMULA 7

| Formula number | R₁ | R₂ | R₃ | V₇ |
|---|---|---|---|---|
| 47 | H | H | H | H |
| 48 | H | H | Cl | H |
| 49 | 4-Cl | H | H | H |

TABLE V.—COMPOUNDS OF THE FORMULAE 8 AND 9

| Formula number | R₁ | R₂ | R₃ | V₈ | Y | Q⊖ |
|---|---|---|---|---|---|---|
| 50 | H | H | H | H | | |
| 51 | 4-Cl | H | H | H | | |
| 52 | H | H | Cl | H | | |
| 53 | 4-CH₃ | H | H | H | | |
| 54 | 4-OCH₃ | H | H | H | | |
| 55 | 4-phenyl | H | H | H | | |
| 56 | H | H | H | CH₃ | | |
| 57 | 3-Cl | 4-Cl | H | H | | |
| 58 | H | H | H | H | CH₃ | SO₄—CH₃ |
| 59 | 3-Cl | H | H | H | CH₃ | SO₄—CH₃ |
| 60 | H | H | Cl | H | CH₃ | SO₃-p-toluyl |
| 61 | 4-CH₃ | H | H | H | CH₃ | SO₄CH₃ |
| 62 | 4-OCH₃ | H | Cl | H | CH₃ | SO₄CH₃ |
| 63 | 3-Cl | 4-Cl | H | H | CH₃ | SO₄—CH₃ |
| 64 | H | H | H | CH₃ | CH₃ | SO₄—CH₃ |
| 65 | H | H | H | H | CH₃ | SO₄—CH₃ |
| 66 | 4-phenyl | H | H | H | CH₃ | SO₄—CH₃ |

TABLE VI.—COMPOUNDS OF THE FORMULAE 10 AND 11

| Formula No. | R₁ | R₂ | R₃ | V₉ | V₁₀ | Y | Q⊖ |
|---|---|---|---|---|---|---|---|
| 67 | H | H | H | H | H | | |
| 68 | 4-Cl | H | H | H | H | | |
| 69 | 4-CH₃ | H | H | H | H | | |
| 70 | H | H | Cl | H | H | | |
| 71 | 3-Cl | 4-Cl | H | H | H | | |
| 72 | 4-OCH₃ | H | H | H | H | | |
| 73 | 4-phenyl | H | H | CH₃ | H | | |
| 74 | H | H | H | Benzyl | H | | |
| 75 | 3-Cl | H | H | CH₃ | H | | |
| 76 | H | H | Cl | CH₃ | H | | |
| 77 | H | H | H | CH₃ | H | CH₃ | SO₄—CH₃ |
| 78 | H | H | Cl | CH₃ | H | CH₃ | SO₃-p-toluyl |
| 79 | H | H | H | Benzyl | H | Phenyl | Br |
| 80 | 3-Cl | H | H | CH₃ | H | CH₃ | SO₃-phenyl |

The compounds according to the invention are distinguished by good compatibility with high molecular organic substances. The new optical brighteners are suitable for whitening high molecular materials, such as polyolefines, for example polyethylene or polypropylene, and also polyvinyl chloride, but above all polyesters, especially polyesters of aromatic polycarboxylic acids with polyhydric alcohols, such as poly(terephthalic acid glycol ester), synthetic polyamides, such as nylon-6 and nylon-66, and also acrylonitrile, cellulose esters, such as cellulose acetate, and cellulose. For brightening polyacrylonitrile or cellulose substrates, those compounds which contain groups conferring solubility in water, such as, for example, quaternary nitrogen, are especially suitable.

The optical brightening of the high molecular colourless organic materials for example is effected by incorporating into it small amounts of optical brighteners according to the invention, preferably 0.001 to 1%, relative to the material to be brightened, optionally together with other additives, such as plasticisers, stabilisers or pigments. Examples of ways of incorporating the brighteners into the plastics are as solutions in plasticisers, such as dioctyl phthalate, or together with stabilisers, such as dibutyl-tin dilaurate or sodium pentaoctyl tripolyphosphate, or together with pigments such as, for example, titanium dioxide. Depending on the nature of the material to be brightened, the brightener can also be dissolved in the monomers before polymerisation, in the polymer composition or, together with the polymer, in a solvent. The material pretreated in this way is thereafter converted into the desired final form in accordance with processes which are in themselves known, such as calendering, pressing, extrusion, spreading, casting and above all spinning and stretching. It is also possible to incorporate the brighteners into finishes, for example into finishes for textile fibres such as polyvinyl alcohol, or into resins or resin precondensates such as, for example, methylol compounds of ethyleneurea, which are used for the treatment of textiles.

Preferably, colourless, high molecluar organic material is also brightened in the form of fibers. For brightening these fibre materials, a dispersion or solution of v-triazoles of the Formula I, according to the invention, is advantageously used. The brightener dispersion or solution preferably contains 0.005 to 0.5% of v-triazole according to the invention, relative to the fibre material. In addition, the dispersion or solution can contain auxiliaries, such as dispersing agents, for example condensation products of fatty alcohols prossessing 10 to 18 carbon atoms, or of alkylphenols, with 15 to 25 mols of ethylene oxide, or condensation products of alkylmonoamines or polyamines, possessing 16 to 18 carbon atoms, with at least 10 mols of ethylene oxide, organic acids such as formic, oxalic or acetic acid, detergents, swelling agents such as dichlorobenzenes and trichlorobenzenes, wetting agents such as sulphosuccinic acid alkyl esters, bleaching agents such as sodium chlorite, peroxides or hydrosulphites, and also optionally brighteners of other classes, such as, for example, derivatives of stilbene which possess an affinity for cellulose.

The brightening of the fibre material with the aqueous brightener treatment bath takes place either by the exhaustion process, at temperatures of, preferably, 30 to 150° C., or by the padding process. In the latter case, the goods are impregnated with a brightener preparation, for example of 0.2 to 0.5% strength, and are then finished, for example by a dry or moist heat treatment, for example by steaming at 2 atmospheres or by drying and then brief dry heating to 180–220° C., in the course of which the fabric is at the same time heat-set, if appropriate. The fiber material treated in this way is finally rinsed and dried.

Colourless high molecular organic material optically brightened according to the invention, especially the synthetic fibre material brightened in accordance with the exhaustion process, shows a pleasing, pure white, blue-violet to blueish-tinged fluorescent appearance, and material of this nature dyed in light colour shades and whitened in accordance with invention is distinguished by a pure colour shade.

The styryltriazoles according to the invention, of the Formula 1, can also be added to detergents, and these can be used for brightening textiles.

The content of optical brightener in the detergents is advantageously 0.001 to 0.5% relative to the solids content of the detergent.

Washing liquors which contain styryl-triazoles according to the invention, of the Formula 1, during washing impart to the textile fibres treated with them, for example cellulose fibres or synthetic polyamide, polyester, polyolefine and cellulose ester fibres, a brilliant appearance in daylight. They can therefore be used particularly for washing these synthetic fibres or the textiles or constituents of textiles consisting of such fibres, or for washing laundry.

The compounds of the Formula 1 are manufactured, according to the invention, by eliminating one mole of water from a compound of the formula

(81) 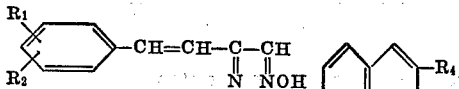

or

(82) 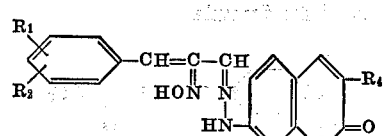

wherein R₁, R₂ and R₄ have the meaning indicated under the Formula 1, under the influence of a condensation agent which has an acid reaction, and optionally with heating.

As examples of condensation agents which have an acid reaction there may be mentioned the hydrogen halide acids, the inorganic anhydrides, phosphorus pentoxide and sulphur trioxide, the mixed inorganic-organic anhydrides, such as the alkanoyl and aroyl, alkylsulphonyl and arylsulphonyl halides, for example acetyl chloride, benzoyl chloride and toluene sulphochloride, and the purely organic anhydrides, such as acetic anhydride, benzoic anhydride and the mixed anhydride of formic acid and acetic acid.

The condensation can be carried out in the presence of organic solvents which are inert under the reaction conditions. Such solvents are high-boiling hydrocarbons and halogenated hydrocarbons, for example chlorobenzene, dichlorobenzenes and xylenes; it is also possible to use inert slightly basic or more strongly basic solvents, for example dimethylformamide, dimethylacetamide or pyridine, picolines and quinolines. Depending on the substituents of the oxime-hydrazones, the cyclisation can be effected by simply leaving the reaction mixture to stand or by heating it. Suitable reaction temperatures are temperatures between room temperature and 250° C., preferably 100 to 150° C. At times the presence of basic catalysts, such as anhydrous alkali metal salts or alkaline earth metal salts of organic acids, for example sodium acetate or potassium acetate, give favourable results as regards yields and purity of the end products. The progress of the cyclisation reaction can best be followed in thin layer chromatograms. The intermediate occurrence of O-acylated intermediate stages when using mixed inorganic-organic or purely organic acid anhydrides is of only insignificant importance as regards the course of the reaction.

As a modification of the process just described, the compounds mentioned are also obtained by oxidatively cyclising a compound of the Formula 81 or 82 and reducing the resulting v-triazole-1-oxide compound with nascent hydrogen to give a compound of the Formula 1. The oxidative cyclisation can be effected by the action of the most diverse oxidising agents; working in oxidation-resistant solvents is advisable. In acid solution, for example, a solution containing acetic acid, bichromate or hydrogen peroxide are usable oxidising agents; in basic solvents, such as pyridine or pyridine-water mixtures, potassium ferricyanide can for example be used. The process which is generally applicable and therefore preferred consists of oxidation with cupric sulphate in pyridine-water. In this, it is not necessary to employ stoichiometric amounts of copper, since the monovalent copper produced during the reaction can be constantly reconverted to the divalent level during the reaction by blowing in air or oxygen.

Reduction with base metals and acids, such as zinc dust in acetic acid or acetic acid-water mixture, is advantageously chosen for the reduction of the triazole-oxides to the triazoles by known methods. Salts of reducing acids of sulphur or phosphorus can however also be used for the reduction.

The route via the triazole-oxide is particularly indicated for the manufacture of compounds of the Formula 1 wherein $R_3$ represents halogen. The halogenation and the reduction of the oxide to the end product can in this case be carried out in one step.

The starting substances for the manufacturing process according to the invention or for the modified process can be obtained in a known manner by nitrosylation of monoketones of the formula (83)

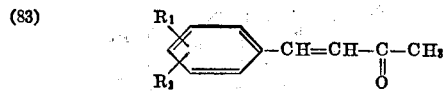

wherein $R_1$ and $R_2$ have the indicated meaning, and reaction of the resulting oxime of the formula (84)

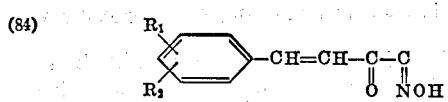

with a compound of the formula (85)

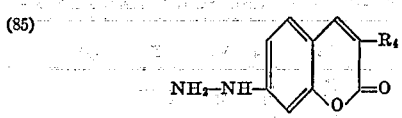

or by coupling of diazotised compounds of the formula (86)

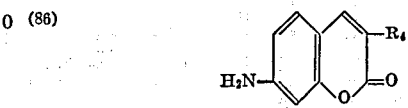

with ketoaldehydes of the formula (87)

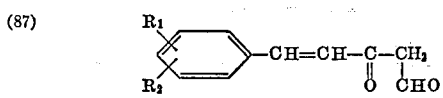

and reaction of the azo compound with hydroxylamine.

The manufacture of quaternised compounds of the Formula 1 takes place in accordance with known methods. The route, described above, via the triazole-oxide is in this case advantageously chosen, since the quaternisation of the radical $R_4$ is most easily carried out in this step. The end product is then obtained as previously described.

Styryl-v-triazoles of the coumarine series according to the invention, of the Formula 1, are finally also obtained if a 2-hydroxy-4-triazolyl-benzaldehyde of the formula (88)

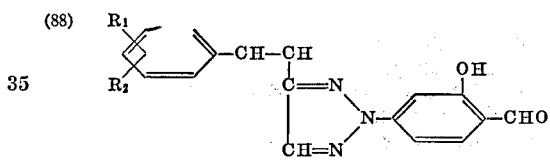

or a derivative thereof, which reacts like such a 2-hydroxy-4-triazolyl-benzaldehyde under the reaction conditions, is condensed, according to methods which are in themselves known, with an optionally ring-substituted diazolyl-acetic acid or triazolyl-acetic acid or with a functional derivative of this acid, under cyclisation conditions.

EXAMPLE 1

19.6 g. of isonitrosobenzalacetone are introduced, at room temperature, into a suspension of 24.3 g. of 3-(pyrazoly-1-yl)-7-hydrazino-coumarine in a mixture of 800 ml. of methanol and 200 ml. of 50% strength acetic acid at room temperature, and thereafter the reaction mixture is stirred for 5 hours at 50 to 55° C. The initially dirty yellow suspension hereupon rapidly changes into the deep orange-red-coloured finely crystalline isonitrosobenzalacetone - [3 - pyrazol-1-yl-coumarinyl(7)]-hydrazone. After cooling, the precipitate is filtered off, washed with methanol and dried in vacuo at 60 to 70° C. 29.5 g. of crude isonitrosobenzalacetone - [3 - pyrazol-1-yl)-coumarinyl-(7)]-hydrazone are obtained.

A suspension of 40.0 g. of the oxime-hydrazone obtained above in 330 ml. of acetic anhydride, is mixed with 24 g. of anhydrous potassium acetate and heated to 80–90° C. over the course of one hour, whilst stirring, and is kept for a further hour at this temperature, whereby a luminous brick red-coloured suspension is produced. Hereafter the reaction temperature is raised to 130–135° C. over the course of one hour and the reaction is completed by stirring for a further five hours, in the course of which the suspension changes to a light brown colour. After cooling, the crystalline reaction product is filtered off, washed twice with 50 ml. of 50% strength acetic acid and then with water, and dried in vacuo at 60 to 70° C. After a preliminary purification by redissolving and reprecipitating from dioxane, and subsequently recrystallising from chlorobenzene using fuller's earth, 26.4 g. of the compound of the formula (14)

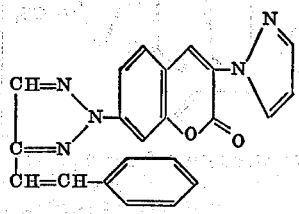

are obtained in the form of fine, pale yellowish-tinged small needles.

The new v-triazole dissolves in organic solvents to give a markedly strong blue-violet fluorescence in daylight. The compound is outstandingly suitable for brightening textile material of polyesters, triacetate, polyamides or polypropylene, both by the exhaustion process and by the thermosol process. Furthermore, the compound can also be added to polyester and polypropylene spinning compositions. After spinning, well-brightened fibres are obtained.

EXAMPLE 2

A solution of tetrapyridine-cupric sulphate, which is manufactured from 38.2 g. of copper sulphate pentahydrate, dissolved in 80 ml. of water, by addition of 40 ml. of pyridine, is added dropwise over the course of 45 minutes, at 95 to 100° C., to a solution of 40.0 g. of isonitrosobenzalacetone - [3 - (pyrazol-1-yl)-coumarinyl(7)]-hydrazone, manufactured as described in paragraph 1 of Example 1, in 325 ml. of pyridine. Thereafter the reaction mixture is stirred for a further 2½ hours at 95 to 100° C. and cooled, and the crystal mass which has separated out is filtered off, washed with dioxane and twice recrystallised from dimethylformamide. 31.4 g. of 2-[3-(pyrazol - 1 - yl) - coumarinyl-(7)]-4-styryl-v-triazole-1-oxide are obtained as light orange-coloured crystals.

39.9 g. of 2-[3-pyrazol-1-yl)-coumarinyl-(7)]-4-styryl-v-triazole-1-oxide are heated with 18.0 g. of zinc dust in 750 ml. of glacial acetic acid for 2 hours, whilst stirring, under a reflux condenser. Thereafter the reaction mixture is filtered whilst hot. The filtrate on cooling yields 3-pyrazol-1-yl)-7-(4-styryl-v-triazol-2-yl)-coumarine. After a recrystallisation from chlorobenzene using fuller's earth, the v-triazole is obtained in the form of fine, pale yellowish small crystal needles. The compound is identical with the v-triazole obtainable according to Example 1.

EXAMPLE 3

22.5 g. of m-chlorobenzal-isonitrosoacetone are added, at room temperature, to a suspension of 24.3 g. of 3-(pyrazol-1-yl)-7-hydrazino-coumarine in a mixture of 800 ml. of methanol and 200 ml. of 50% strength acetic acid, and the reaction mixture is stirred for 2 hours at room temperature and subsequently for 6 hours at 50 to 55° C. After cooling, the orange-red oxime-hydrazone is filtered off, washed three times with 50 ml. of methanol and dried in vacuo at 60 to 70° C. 34.6 g. of crude isonitroso-m-chlorobenzalacetone - [3 - (pyrazol-1-yl)-coumarine-(7)]-hydrazone are obtained as an orange-red crystal powder.

43.9 g. of the oxime-hydrazone obtained above and 22.5 g. of anhydrous potassium acetate in 350 ml. of acetic anhydride are heated to 89–95° C. over the course of ½ hour whilst stirring and excluding moisture, and kept at the same temperature for ½ hour. Thereafter the reaction temperature is raised to 130–135° C. and is maintained for a further 4½ hours. After cooling, the crystalline precipitate is filtered off, washed three times with 50 ml. of 50% strength acetic acid and subsequently with water, and dried. After a preliminary purification by redissolving and reprecipitating from chlorobenzene, and a subsequent recrystallisation from chlorobenzene using fuller's earth, 26.7 g. of the compound of the formula (16)

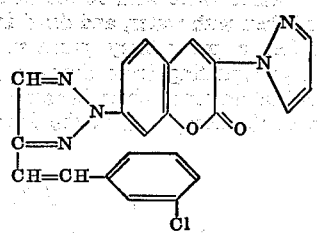

are obtained in the form of pale yellow crystals.

The new v-triazole dissolves in organic solvents to give a markedly strong blue-violet fluorescence in daylight, and has an excellent capacity for brightening polyester fibres by the exhaustion process and thermosol process, as well as by incorporation into the spinning composition. It is equally capable of imparting a brilliant white to polyamide, 2½-acetate, triacetate and polyacrylonitrile fibres.

EXAMPLE 4

41.2 g. of 2-[3-(3-methyl-pyrazol - 1 - yl)-coumarinyl-(7)] - 4 - styryl - v - triazole - 1 - oxide (manufactured analogously to the description in Example 2) in a mixture of 500 ml. of dioxane and 50 ml. of water are brought to the reflux temperature. Hydrochloric acid gas is passed in for 5 hours at the boil, and the reaction mixture is then cooled. The crystalline precipitate formed is filtered off and washed with methanol. After recrystallisation from chlorobenzene using fuller's earth, the compound of the formula (25)

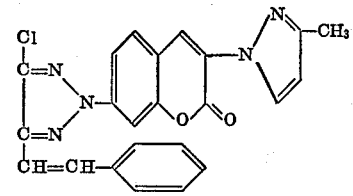

is obtained in the form of light yellow crystals which dissolve in chlorobenzene to give an intense blue-violet fluorescence. The compound imparts a brilliant white effect to fibres of polyesters, polyamides, 2½-acetate, triacetate and polypropylene. It can also be added successfully to spinning compositions.

EXAMPLE 5

19.6 g. of isonitrosobenzalacetone are introduced, at room temperature, into a suspension of 24.2 g. of 7-hydrazino - 3 - (1,2,4 - triazol - 1 - yl) - coumarine in a mixture of 800 ml. of methanol and 200 ml. of 50% strength acetic acid at room temperature, and thereafter the reaction mixture is stirred for 5 hours at 50 to 55° C. The initially dirty yellow suspension hereupon rapidly changes into the deep orange red-coloured finely crystalline isonitrosobenzalacetone-[3-(1,2,4-triazol - 1 - yl)-coumarinyl-(7)]-hydrazone. After cooling, the precipitate is filtered off, washed with methanol and dried in vacuo at 60 to 70° C. 30.4 g. of crude isonitrosobenzalacetone-[3-(1,2,4-triazol-1-yl) - coumarinyl-(7)-]-hydrazone are obtained.

A suspension of 40.0 g. of the oxime-hydrazone, obtained above, in 330 ml. of acetic anhydride is mixed with 24 g. of anhydrous potassium acetate and heated to 80–90° C. over the course of one hour, whilst stirring, and kept for a further hour at this temperature, whereby a luminous brick-red coloured suspension is produced. Thereafter the reaction temperature is raised to 130–135° C. over the course of one hour and the reaction is completed by stirring for a further five hours, in the course of which the colour of the suspension changes to light brown. After cooling, the crystalline reaction product is filtered off, washed twice with 50 ml. of 50% strength acetic acid and then with water, and dried in vacuo at 60 to 70° C. After a preliminary purification by redissolving and reprecipitating from dioxane and a subsequent recrystallisation from chlorobenzene using fuller's earth, 26.8 g. of the compound of the formula (50)

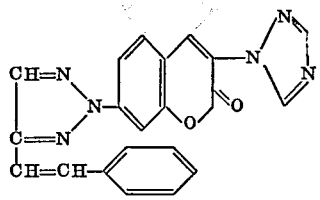

are obtained in the form of fine, pale yellowish-tinged small needles of melting point 210 to 212° (uncorrected).

The new v-triazole dissolves in organic solvents to give a markedly strong blue-violet fluorescence in daylight. The compound is outstandingly suitable for brightening textile material of polyesters, triacetate, polyamides, polyacrylonitriles or polypropylene both by the exhaustion process and by the thermosol process. Furthermore, the compound can also be added to polyester, polyacrylonitrile and polypropylene spinning compositions. After spinning, well-brightened fibres are obtained.

EXAMPLE 6

A solution of tetrapyridine-cupric sulphate, which is manufactured from 38.2 g. of copper sulphate pentahydrate, dissolved in 80 ml. of water, by adding 40 ml. of pyridine, is added dropwise over the course of 45 minutes, at 95 to 100° C., to a solution of 40.0 g. of isonitrosobenzalacetone - [3 - (1,2,4 - triazol - 1 - yl)-coumarinyl-(7)-]-hydrazone in 325 ml. of pyridine. Thereafter the reaction mixture is stirred for a further 2½ hours at 95–100° C. and cooled, and the crystal mass which has separated out is filtered off, washed with dioxane and twice recrystallised from dimethylformamide. 28.4 g. of 2-[3-(1,2,4-triazol - 1 - yl)-coumarinyl-(7)-]-4-styryl - v - triazole - 1 - oxide are obtained as light orange-coloured crystals.

39.9 g. of 2-[3-(1,2,4-triazol-1-yl)-coumarinyl-(7)-]-4-styryl-v-triazole-1-oxide and 18.0 g. of zinc dust in 750 ml. of glacial acetic acid are heated for 2 hours under a reflux condenser whilst stirring. Thereafter the reaction mixture is filtered hot. On cooling, the filtrate yields 25.2 g. of 3-(1,2,4-triazol-1-yl)-7-(4-styryl-v-triazol-2-yl)-coumarine. After one recrystallisation from chlorobenzene using fuller's earth, the v-triazole is obtained in the form of fine, pale yellowish small crystal needles.

The compound is identical with the v-triazole obtainable according to Example 5.

EXAMPLE 7

39.9 g. of 2-[3-(1,2,4-triazol-1-yl)-coumarinyl-(7)-]-4-styryl-v-triazole-1-oxide in 200 ml. of chlorobenzene are stirred with 14 g. of dimethyl sulphate at 130° C. After stirring for one hour at 130° C. the mixture is allowed to cool and the quaternary salt which has separated out is filtered off, washed with chlorobenzene and dried. 43.4 g. of light yellowish, granular crystals of 2-[-3-(4-methyl-1,2,4-triazolium-(1) - coumarinyl-(7)]-4-styryl-v-triazole-1-oxide-methosulphate, which easily dissolve in water, are obtained.

39.9 g. of 2-[3 - (4 - methyl - 1,2,4 - triazolium-(1)-coumarinyl-(7)-]-4-styryl-v-triazole - 1 - oxide-methosulphate and 18.0 g. of zinc dust in 750 ml. of glacial acetic acid are heated for 2 hours under a reflux condenser, whilst stirring. Thereafter the reaction mixture is filtered hot. On cooling, the filtrate yields 29.8 g. of the compound of the formula (58)

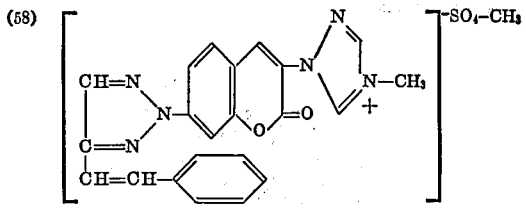

After a recrystallisation from aqueous alcohol, using animal charcoal, the v-triazole is obtained in the form of fine, pale yellowish small crystal needles which begin to melt, with decomposition, at 270° C. The new v-triazole dissolves in solvents to give a markedly strong blue-violet fluorescence in daylight. The compound is outstandingly suitable for brightening textile material of polyacrylonitriles.

EXAMPLE 8

0.12 ml. of 85% strength formic acid and 0.06 g. of alkyl polyglycol ether are added to 100 ml. of water. A solution of the optical brightener of the Formula 58 is manufactured by dissolving 1 g. in 1,000 ml. of ethylene glycol monomethyl ether. 1.25 ml. of this stock solution are added to the solution described above. The liquor thus obtained is warmed to 60° C. and a polyacrylonitrile fabric weighing 3 g. is introduced into it. The temperature is raised to 95–98° C. over the course of 10 to 15 minutes and the system is left at this temperature for one hour. The fabric is then rinsed for 2 minutes in running water and is subsequently dried for 20 minutes at 60° C. The fabric treated in this way shows a brilliant white appearance.

If the procedure indicated in the above example is followed but instead of the brightener mentioned therein the brighteners of the Formulae 30, 32, 44, 45, 46, 59, 61, 62, 64, 77, 79 or 80 are used, similar results are obtained.

EXAMPLE 9

0.2 g. of sodium nitrate, 0.2 g. of 80% strength sodium chlorite, 0.2 g. of oxalic acid or an equivalent amount of another organic or inorganic acid suitable for this purpose, and 0.06 g. of alkyl polyglycol ether are added to 100 ml. of water. A solution of the brightener of the Formula 58 is manufactured by dissolving 1 g. of the said brightener in 1,000 ml. of ethylene glycol monomethyl ether. 1.5 ml. of this stock solution are added to the solution described above. This liquor is warmed to 60° C., a polyacrylonitrile fabric weighing 3 g. is then added thereto, the temperature is raised to 95–98° C. over the course of 10 to 15 minutes and the bath is left at this temperature from 60 minutes. The fabric is then rinsed in cold water and dried for 20 minutes at 60° C. The fabric thus treated shows a white, brilliant appearance.

Similar results are obtained if the same procedure as described above is followed but the brighteners of the Formulae 31, 33, 38, 39, 45, 60, 63, 64, 65, 66, 77 or 78 are employed.

EXAMPLE 10

0.2 g. of trichlorobenzene is added as a carrier to 100 ml. of water and a solution of 0.0015 g .of the brightener of the Formula 50 in 1.5 ml. of dimethylformamide is added. The liquor thus obtained is warmed to 60° C. and 3 g. of a polyester fabric are introduced into it. The temperature is raised to 95–98° C. over the course of 10 to 15 minutes and the liquor is left at this temperature for one hour. The fabric is then rinsed for 2 minutes in running water and is subsequently dried for 20 minutes at 60° C. The fabric treated in this way shows a white, brilliant appearance.

A similar result is obtained if a brightener of the Formula 14, 15, 16, 20, 22, 23, 26, 27, 28, 29, 34, 40, 42, 47, 52, 67 or 73 is used.

EXAMPLE 11

0.15 ml. of trichlorobenzene, as a carrier, and 0.3 ml. of alkyl polyglycol ether are added to 290 ml. of water. A solution of the optical brightener of the Formula 50 is prepared by dissolving 1 g. in 1,000 ml. of dimethylformamide. 7.5 ml. of this stock solution are added to the solution described above. The aqueous dispersion containing the optical brightener is warmed to 60° C. A polyester fabric weighing 15 g. is then introduced into the solution. The temperature is raised to 130° C. over the course of 15 to 20 minutes and the fabric is left at this temperature for 30 minutes. The whole is then cooled to 60° C. over the course of 10 to 15 minutes. The fabric is then rinsed for 2 minutes in running cold water and is subsequently dried for 20 minutes at 60° C. The fabric treated in this way shows a white and brilliant appearance.

A similar result is obtained if the same procedure as described above is followed but a brightener of the Formula 14, 16, 17, 18, 21, 24, 25, 35, 36, 38, 40, 41, 48, 49, 51, 54, 55, 68, 69 or 70 is employed.

EXAMPLE 12

0.06 ml. of 40% strength acetic acid and 0.06 ml. of alkyl polyglycol ether are added to 95 ml. of water. A solution of the optical brightener of the Formula 5 is prepared by dissolving 1 g. in 1,000 ml. of dimethylformamide. 6 ml. of this stock solution are added to the solution described above. The aqueous liquor containing the brightener is warmed to 60° C. and a triacetate fabric weighing 3 g. is added thereto. The temperature is raised to 95–98° C. over the course of 10 to 15 minutes and the liquor is left at this temperature for 30 minutes. The fabric is then rinsed and dried. The fabric treated in this way shows a white brilliant appearance.

Similar brightening effects can be achieved, for example, with the compounds of the Formulae 14, 16, 19, 21, 25, 28, 40, 48, 52, 56, 72 or 75.

EXAMPLE 13

100 parts of polypropylene, 0.5 part of titanium dioxide and 0.05 part of the optical brightener of the Formula 50 are homogenised in a kneader at 200° C. The melt is spun under an inert gas at 2 to 3 atmospheres gauge, and at a temperature of 280 to 300° C., through spinnerets in accordance with known methods. The polypropylene filaments thus obtained are distinguished by a high degree of whiteness.

If instead of the abovementioned brightener the same amounts of a brightener of the Formula 14, 16, 22, 25, 27, 48, 73, or 74 are used, and in other respects the same procedure is employed, similar effects are obtained.

We claim:

1. A styryl-triazole of the formula

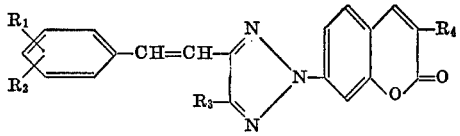

wherein $R_1$ is hydrogen, halogen, alkyl with 1 to 4 carbon atoms, alkoxy with 1 to 4 carbon atoms or phenyl, $R_2$ is hydrogen or halogen, $R_3$ is hydrogen or halogen and $R_4$ is imidazol-1-yl, pyrazol-1-yl, or 1, 2, 4-triazol-1-yl which is unsubstituted or substituted by alkyl of 1 to 4 carbon atoms or phenyl, or $R_4$ is benzimidazol-2-yl, benzotriazol-1-yl or benztriazol-2-yl which is unsubstituted or substituted in the benzene moiety by 1 or 2 of chloro, alkyl of 1 to 4 carbon atoms and alkoxy of 1 to 4 carbon atoms and where $R_4$ can additionally be quaternized by an alkyl of 1 to 4 carbon atoms or benzyl substituent on a nitrogen atom, and the anion of a strong acid.

2. A styryl-triazole according to claim 1, in which $R_4$ corresponds to the formula

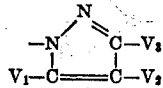

wherein $V_1$ and $V_3$ independently of one another denote hydrogen, alkyl with 1 to 4 carbon atoms or phenyl and $V_2$ denotes hydrogen or halogen.

3. A styryl-triazole according to claim 1, in which $R_4$ corresponds to the formula

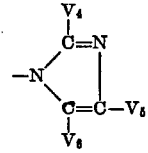

wherein $V_4$, $V_5$ and $V_6$ denote hydrogen, alkyl with 1 to 4 carbon atoms or phenyl, or $V_5$ and $V_6$ together with the carbon atoms to which they are attached denote a fused phenylene ring which is optionally substituted by chlorine or methyl.

4. A styryl-triazole according to claim 1, in which $R_4$ corresponds to the formula

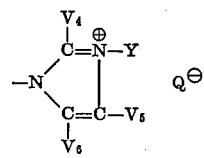

wherein $V_4$, $V_5$ and $V_6$ denote hydrogen, alkyl with 1 to 4 carbon atoms or phenyl, or $V_5$ and $V_6$ together with the carbon atoms to which they are attached denote a fused phenylene ring which is optionally substituted by chlorine or methyl, Y denotes alkyl with 1 to 4 carbon atoms or benzyl and Q denotes chlorine, bromine, $SO_4$-alkyl(1–4 C), $SO_3$-phenyl or $SO_3$-p-toluyl.

5. A styryl-triazole according to claim 1, in which $R_4$ according to the formula of claim 1 represents a benzotriazol-1-yl radical of the formula

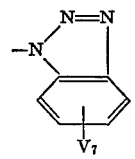

wherein $V_7$ denotes hydrogen, chlorine or methyl.

6. A styryl-triazole according to claim 1, in which $R_4$ corresponds to the formula

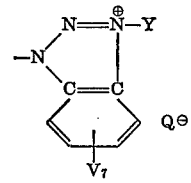

wherein $V_7$ represents hydrogen, chlorine or methyl, Y denotes alkyl with 1 to 4 carbon atoms or benzyl and Q denotes chlorine, bromine, $SO_4$—alkyl (1 to 4 C), $SO_3$-phenyl or $SO_3$-p-toluyl.

7. A styryl-triazole according to claim 1, in which $R_4$ denotes a radical of the formula

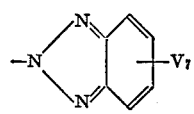

wherein $V_7$ represents hydrogen, chlorine or methyl.

8. A styryl-triazole according to claim 1, in which $R_4$ corresponds to the formula

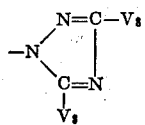

wherein $V_8$ denotes hydrogen or alkyl with 1 to 4 carbon atoms.

9. A styryl-triazole according to claim 1, in which $R_4$ corresponds to the formula

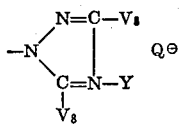

wherein $V_8$ denotes hydrogen or alkyl with 1 to 4 carbon atoms. Y denotes alkyl with 1 to 4 carbon atoms or benzyl and Q denotes chlorine, bromine, $SO_4$—alkyl (1 to 4 C), $SO_3$-phenyl or $SO_3$-p-toluyl.

10. A styryl-triazole according to claim 1, in which $R_4$ corresponds to a radical of the formula

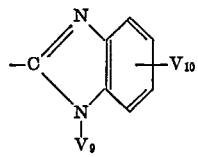

wherein $V_9$ denotes hydrogen, alkyl with 1 to 4 carbon atoms or benzyl and $V_{10}$ denotes hydrogen, chlorine or methyl.

11. A styryl-triazole according to claim 1, in which $R_4$ corresponds to a radical of the formula

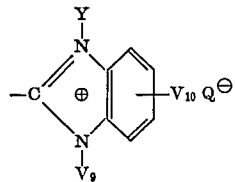

wherein Y denotes alkyl with 1 to 4 carbon atoms or benzyl, $V_{10}$ denotes hydrogen, chlorine or methyl, $V_9$ denotes alkyl with 1 to 4 carbon atoms of benzyl and Q denotes chlorine, bromine, $SO_4$—alkyl (1 to 4 C), $SO_3$-phenyl or $SO_3$-p-toluyl.

12. A styryl-triazole according to claim 1 in which $R_1$, $R_2$ and $R_3$ denote hydrogen.

13. A styryl-triazole according to claim 1 which corresponds to the formula

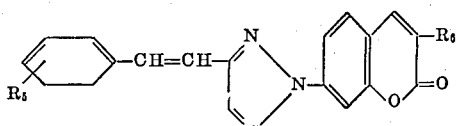

wherein $R_5$ denotes hydrogen, chlorine, methyl or phenyl and $R_6$ denotes imidazol-1-yl, benzimidazol-2-yl, benzotriazol-1-yl, benzotriazol-2-yl or 1,2,4-triazol-1-yl.

14. A styryl-triazole according to claim 1, which corresponds to the formula

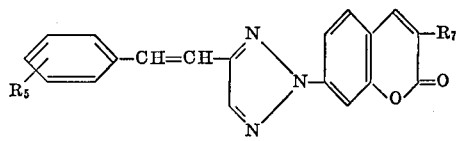

wherein $R_5$ denotes hydrogen, chlorine, methyl or phenyl and $R_7$ denotes benzotriazolium - 1 - yl, 1,2,4-triazolium-1-yl or benzimidazolium-2-yl.

References Cited
UNITED STATES PATENTS 3,271,412   9/1966   Raue et al. _____ 260—240 D X

FOREIGN PATENTS 6800021   7/1968   Netherlands _____ 260—240 N

JOHN D. RANDOLPH, Primary Examiner

U.S. Cl. X.R.

106—176; 117—33.5 T; 252—301.2 W, 543; 260—37 NP, 37 P, 45.7 R, 71, 75 T, 78 S, 91.3, 93.7, 141, 240 D, 240 G, 240 R, 308 A